No. 764,347. PATENTED JULY 5, 1904.
F. W. CARLSON.
PIPE COUPLING OR CONNECTION.
APPLICATION FILED AUG. 15, 1903.
NO MODEL. 2 SHEETS—SHEET 1.

Witnesses:

Inventor
Frank W. Carlson

No. 764,347. PATENTED JULY 5, 1904.
F. W. CARLSON.
PIPE COUPLING OR CONNECTION.
APPLICATION FILED AUG. 15, 1903.
NO MODEL. 2 SHEETS—SHEET 2.

Witnesses:
Inventor:
Frank W. Carlson

No. 764,347. Patented July 5, 1904.

UNITED STATES PATENT OFFICE.

FRANK W. CARLSON, OF CHICAGO, ILLINOIS.

PIPE COUPLING OR CONNECTION.

SPECIFICATION forming part of Letters Patent No. 764,347, dated July 5, 1904.

Application filed August 15, 1903. Serial No. 169,609. (No model.)

*To all whom it may concern:*

Be it known that I, FRANK W. CARLSON, a citizen of the United States, residing at Chicago, in the county of Cook and State of Illinois, have invented certain new and useful Improvements in Pipe Couplings or Connections, of which the following is a specification.

My present invention relates to pipe-couplings of the general type disclosed in United States Letters Patent No. 706,298, granted to me on August 5, 1902, and adapted particularly for making a gas and water-tight joint between sewer and soil pipes or for a clean-out connection.

The object of the invention is to simplify and improve the construction of my patented coupling and provide a coupling of few parts which can be easily and quickly adjusted and secured tightly in place.

Figure 1:
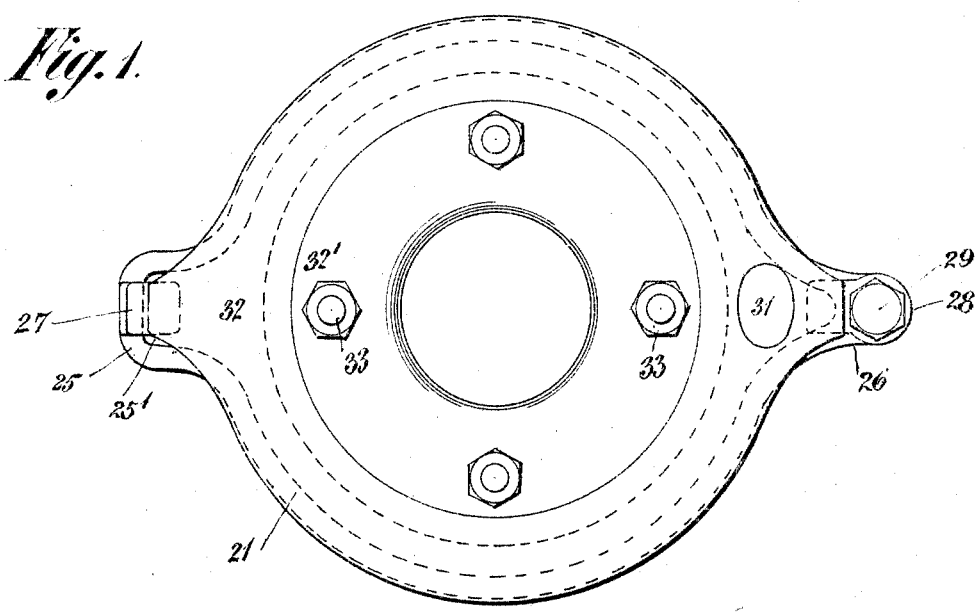
Figure 2:
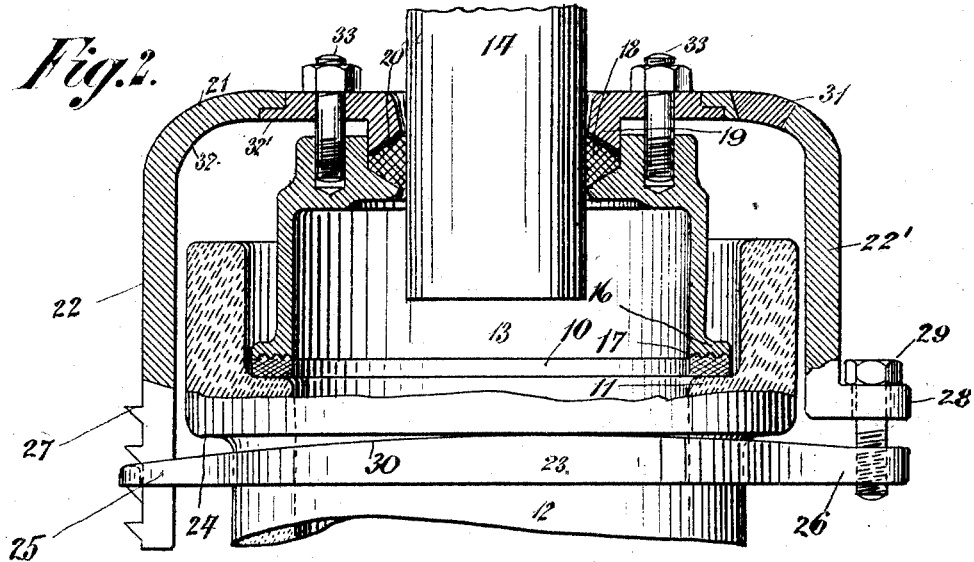
Figure 3:
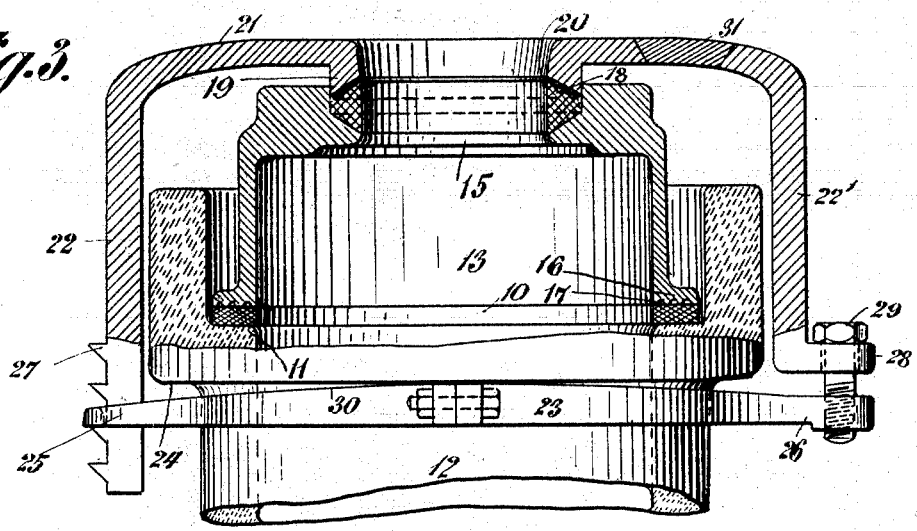
Figure 4:
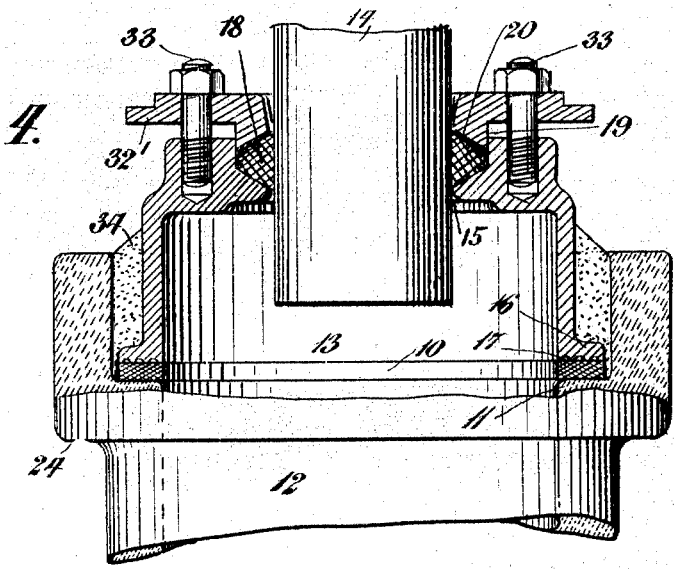

In the accompanying drawings, Figure 1 is a top plan view of one embodiment of the invention. Fig. 2 illustrates the same coupling partly in elevation and partly in section. Fig. 3 shows another embodiment of the invention. Fig. 4 is a view similar to Fig. 2 and showing the coupling secured in place with cement and without the yoke.

Referring to the drawings, in which like numerals of reference denote corresponding parts in the several figures, 10 designates a packing which rests upon a shoulder 11 within the end of the sewer or other pipe 12, and 13 is a section or member of my improved coupling or connection which is secured in place against said packing and constitutes the main connection between the pipe 12 and the soil or other pipe 14, which enters the section through the opening 15 in the top thereof. The section 13 is preferably provided with a peripheral flange 16, having corrugations 17 on its face to form a tighter joint with the packing. The wall of the opening 15 is constructed to hold the packing 18 and form, with the gland 19, a stuffing-box to make a tight joint between the section 13 and the pipe 14. I also preferably use a divided washer 20 between the packing and the gland to protect the packing.

The coupling or connection is clamped tightly to both of the pipes, preferably by means of a yoke 21, which carries the gland 19, and has oppositely-depending ends 22 22', which are connected to a lever 23, arranged beneath the peripheral shoulder 24 on the pipe 12. This lever is preferably in the form of a divided ring constructed to encircle the pipe 12 beneath its shoulder 24 and provided with oppositely-projecting lugs 25 26. The end 22 of the yoke is adapted to enter an opening 25' in the lug 25 of the lever and is provided with stops or projections 27 to engage one wall of said opening, whereby the parts may be adjusted with relation to each other, as required. The end 22' of the yoke is provided with a lug 28, and a bolt 29 passes through said lug and screws into the lug 26 on the lever. The lever is adapted to be fulcrumed midway between its ends against the shoulder 24 of the pipe 12, and this may be accomplished, as shown in the drawings, by inclining the operative face 30 of the lever upward from its ends to its center, making the lever higher at the center than at its ends.

It will be readily understood that in securing the coupling or connection in place the lug 25 of the lever will be engaged with one of the stops 27, and then the parts will be clamped together and secured tightly in place by forcing the opposite end of the lever up adjacent to the lug 28 and securing it to the yoke by means of the bolt 29. Under ordinary circumstances it would probably be sufficient to move the lever but slightly on its fulcrum to clamp the parts properly together; but it will be observed that to secure the parts in place I employ only a single bolt, and thereby greatly simplify the construction and operation and reduce the cost of manufacture. At the same time that the parts are secured in place the section 13 is clamped against the packing 10 on the shoulder 11 to form a tight joint with the pipe 12, and the gland 19 is caused to compress the packing 18 and form a tight joint between the section 13 and the pipe 14, thus joining the two pipes together in a superior manner and preventing the escape of gas or water.

I prefer to make the yoke of such shape that it will completely cover the end of the pipe 12 and prevent water and dirt from entering between said pipe and the section 13.

A removable plug 31 may be provided in the yoke to permit the joint between the pipe 12 and section 13 to be tested. The yoke may be made in one part, as shown in Fig. 3, or in two parts 32 32', as shown in Fig. 2. In the latter construction the part 32', carrying the gland 19, is adjustably connected to the section 13 by means of bolts 33, so that the coupling can be used without the part 32 and the lever 23, in the manner shown in Fig. 4, and secured to the pipe 12 by cement 34.

My invention is particularly intended to be used as a coupling or connection for an earthenware sewer-pipe and a metal soil-pipe; but of course I do not limit myself to this use of the invention. By clamping the coupling or connection independently on both of the pipes and also securing the coupling in place at the same time I not only provide an air and water tight joint with each of the pipes, but also greatly simplify the application of the coupling and avoid the necessity of using a number of different parts for adjusting and securing the coupling in place. The lever provides a simple and effective means for tightening the joints and securing the coupling in place and enables a very tight joint to be made with each pipe.

Without limiting myself to the exact construction and arrangement of parts or to the particular embodiment of the invention illustrated in the drawings, what I claim as new, and desire to secure by Letters Patent, is—

1. In a pipe coupling or connection, the combination of a sewer-pipe, a member within the end of said pipe, a soil-pipe entering the member through an opening therein, packing between the member and each of said pipes, and means for clamping the parts together and at the same time forming tight joints with each of said pipes.

2. In a pipe coupling or connection, the combination of a sewer-pipe, a section within the end of said pipe, a soil-pipe entering the section through an opening in its top, packing between the section and each of said pipes, and a lever connected with the section for clamping the parts together and at the same time forming tight joints with each of said pipes.

3. In a pipe coupling or connection, the combination of a sewer-pipe provided with an external shoulder, a section within the end of said pipe, a soil-pipe entering the section through an opening in its top, packing between the section and each of said pipes, and a lever connected with said section and bearing against said shoulder for clamping the parts together and at the same time forming tight joints with each of said pipes.

4. In a pipe coupling or connection, the combination of a sewer-pipe, an external shoulder on said pipe, a section within the end of said pipe, a soil-pipe entering the section through an opening at its top, packing between the section and each of said pipes, a yoke provided with depending ends, and a lever operating against said shoulder and connected with the ends of the yoke to clamp the parts together and at the same time form tight joints with each of the said pipes.

5. In a pipe coupling or connection, the combination of a sewer-pipe, an external shoulder on said pipe, a section within the end of said pipe, a soil-pipe entering the section through an opening at its top, packing between the section and each of said pipes, a yoke provided with depending ends, and a lever in the form of a ring encircling the sewer-pipe and connected with the ends of the yoke and operating against said shoulder for clamping the parts together and at the same time forming tight joints with each of said pipes.

6. In a pipe coupling or connection, the combination of a sewer-pipe, an external shoulder on said pipe, a section within the end of said pipe, a soil-pipe entering the section through an opening at its top, packing between the section and each of said pipes, a yoke provided with depending ends, and a lever with one face thereof inclined from its middle to its ends to operate against said shoulder and connected with the ends of the yoke to clamp the parts together and at the same time form tight joints with each of said pipes.

7. In a pipe coupling or connection, the combination of a sewer-pipe, an external shoulder on said pipe, a section within the end of said pipe, a soil-pipe entering the section through an opening in its top, packing between the section and each of said pipes, a yoke having depending ends, one provided with stops and the other carrying a fastening device, and a lever operating against said shoulder and adapted to be engaged with one of said stops and fastened by said fastening device.

FRANK W. CARLSON.

Witnesses:
JOHN ANDERSON,
C. P. FRYE.